Jan. 19, 1960     F. I. ERNEST     2,921,796
WORK-HOLDING CHUCK

Filed March 17, 1959     5 Sheets-Sheet 1

INVENTOR.
FREDERICK I. ERNEST
BY
Eugene C. Knoblock
ATTORNEY

Jan. 19, 1960   F. I. ERNEST   2,921,796
WORK-HOLDING CHUCK

Filed March 17, 1959   5 Sheets-Sheet 2

INVENTOR.
FREDERICK I. ERNEST
BY Eugene C. Knoblock
ATTORNEY

INVENTOR.
FREDERICK I. ERNEST

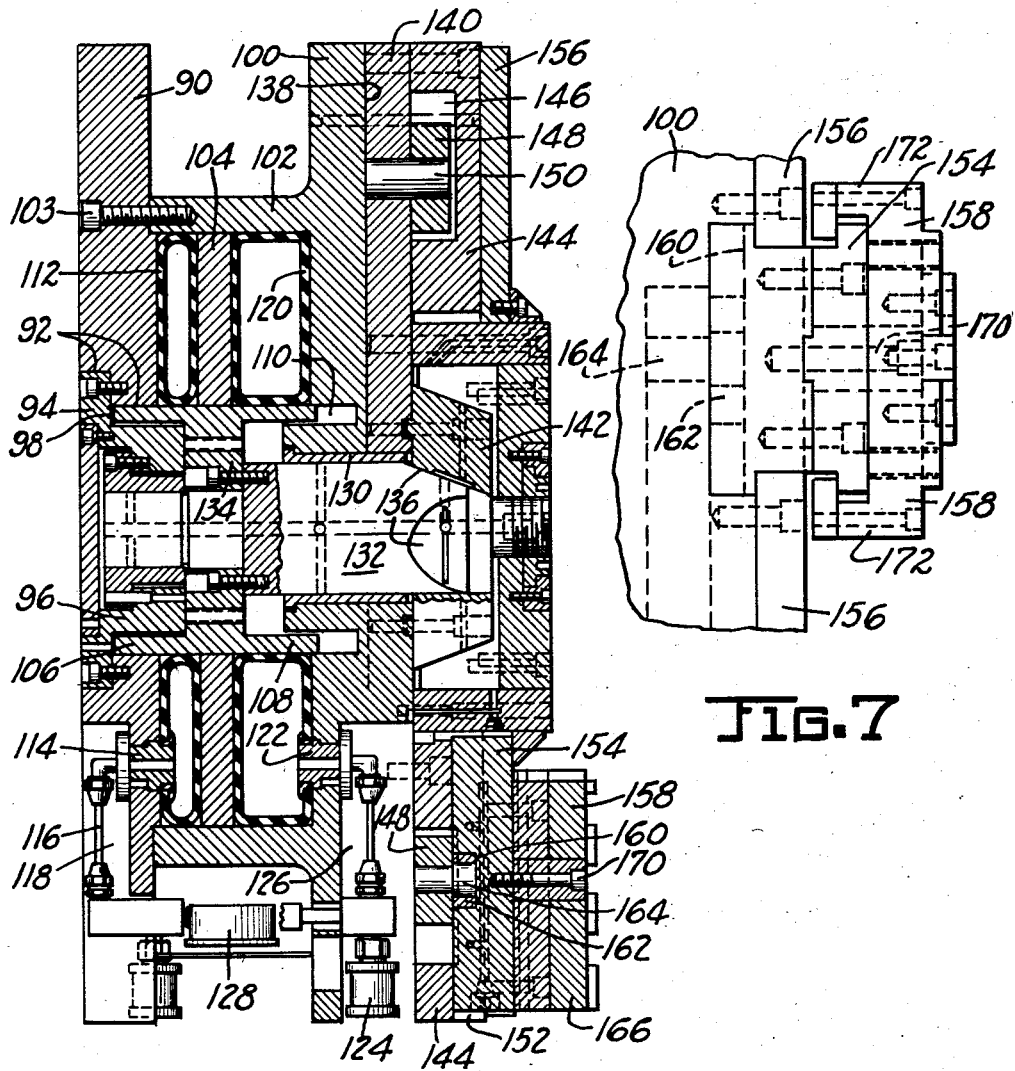

United States Patent Office 2,921,796
Patented Jan. 19, 1960

2,921,796

WORK-HOLDING CHUCK

Frederick I. Ernest, Elkhart, Ind.

Application March 17, 1959, Serial No. 799,880

10 Claims. (Cl. 279—110)

This invention relates to improvements in work holding chucks.

The primary object of the invention is to provide a chuck or work holder having a plurality of work gripping jaws arranged in pairs for actuation by actuating means and provided with means for compensating the actuation of the jaws of each pair to balance the application of pressure thereby to the work piece.

A further object is to provide a chuck or work holder having a plurality of actuators adapted for simultaneous actuation, and each associated with a plurality of working jaws and connected thereto by compensating means for effecting equal pressure application to the work at each of the jaws.

A further object is to provide a device of this character which is simple in construction, inexpensive, easy to assemble and operate, trouble-free in operation, and which requires a minimum number of actuating parts and provides a novel cooperative relation between the actuating parts.

Other objects will be apparent from the following specification.

In the drawings:

Fig. 6 is a sectional view taken on line 6—6 of Fig. 5;

Fig. 7 is a fragmentary edge view viewed in the direction of the arrow 7 in Fig. 5.

Figure 1:
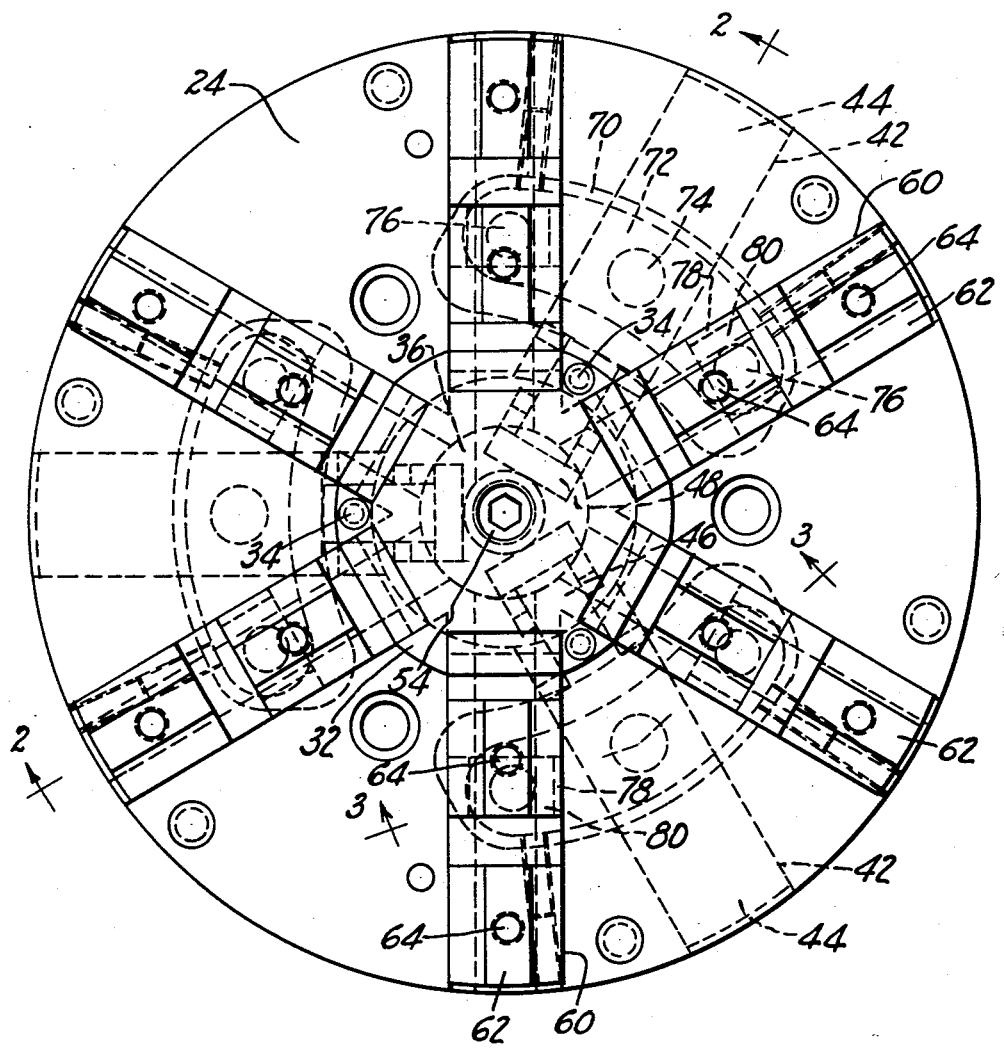
Fig. 1 is a face view illustrating one embodiment of the invention.

Referring to the drawings, and particularly to Figs. 1 to 4, inclusive, which illustrate one embodiment of the invention, the numeral 10 designates a base or backing plate having a central aperture 12 therein and preferably being provided with a concentric circular recess in its inner face to define an annular inner shoulder 14. A body plate or disk 16, having a central reduced circular projection 18, is secured in concentric relation to the base plate 10 by the cooperative guide interfit of the parts 14 and 18. Securing screws 20 secure the body 16 to the back plate 10. The body 16 is provided with a central bore 22 whose diameter may be larger than the diameter of the aperture 12 in the backing plate 10.

A face plate 24 is secured to the body 16 in concentric relation thereto and is preferably circular and of substantially the same diameter as the body 16. Any suitable securing means 26, such as machine screws, may be employed to hold the face plate 24 in assembled relation on the body concentric therewith. The face plate 24 has a central circular recess 28 in its inner or rear face, preferably of the same diameter as the bore 22 of the body and concentric therewith. An aperture 30 of smaller diameter than the recess 28 and concentric therewith is formed in the face plate 24. A closure plate 32 spans the opening 30 and is preferably secured thereto by cap screws or other securing means 34. Closure plate 32 preferably includes a reduced diameter rearwardly projecting portion 36 which has a snug sliding fit in the recess 30. Closure plate 32 and its reduced rear projection 36 are provided with a central bore 38 having a screw-threaded outer portion 40.

Figure 2:
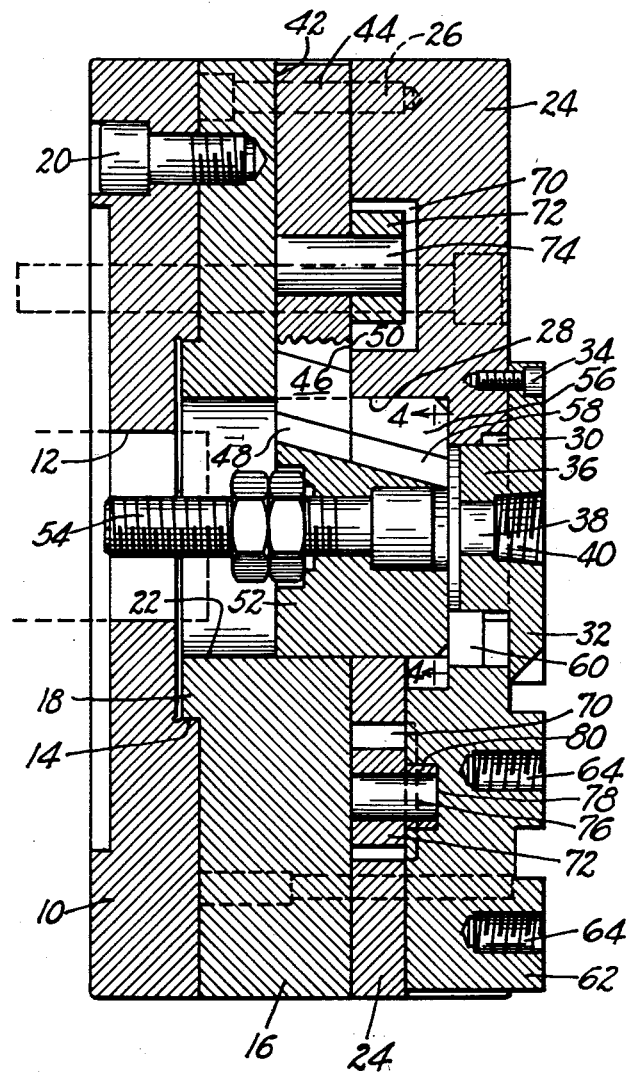
Fig. 2 is a sectional view taken on line 2—2 of Fig. 1, with one part thereof shown partially in elevation.
Figure 3:
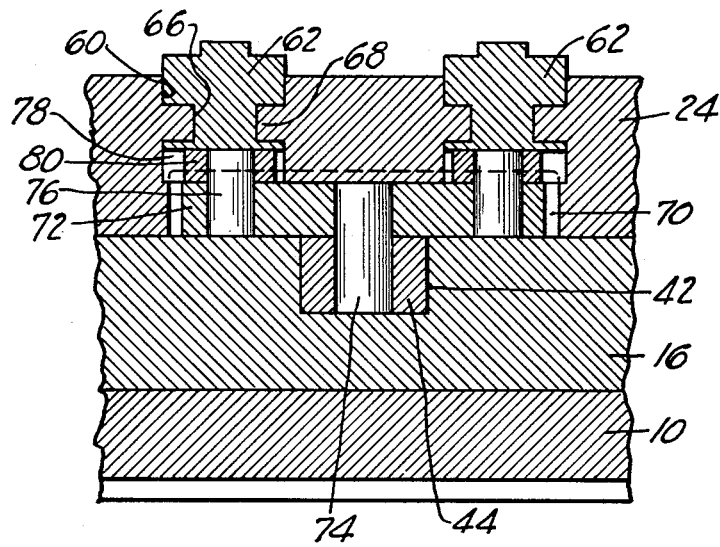
Fig. 3 is a fragmentary sectional view taken on line 3—3 of Fig. 1.
Figure 4:
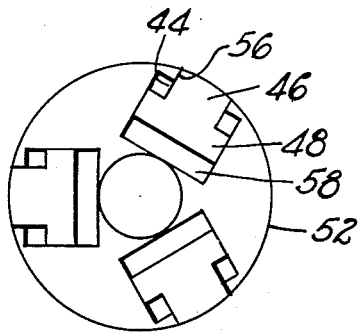
Fig. 4 is a fragmentary sectional view taken on line 4—4 of Fig. 2.

The front or forward face of the body 16 is provided with a plurality of radial grooves 42. Within each of these grooves is slidably mounted and guided an elongated radial bar 44. Each bar 44 has a reduced width inner or neck portion 46 and a T-shaped inner head portion 48. The neck portion 46 is preferably defined in part by a diagonal or inclined shoulder 50, and the T-shaped head 48 has its inner and outer surfaces extending diagonally to the axis of the parts 10, 16 and 24, as best seen in Fig. 2.

A disk or head 52 fits slidably in the bores 22 and 28 and mounts centrally thereof an axially rearwardly or outwardly projecting screw-threaded shank 54 projecting through the aperture 12 in the back plate 10. The shank 54 provides means for attachment to any suitable actuating means (not shown) adapted to shift axially of the device for the purpose of controlling the longitudinal position of the disk 52 within the openings 22 and 28. The disk 52 is provided with a plurality of radial slots 56 extending full length thereof and having enlarged inner or T-shaped ways 58. The width of each recess or slot 56 is such as to snugly and slidably receive the neck portion 46 of a bar 44, and the T-shaped or enlarged inner part 58 of each recess slidably receives the T-head 48 on the inner end of each bar. The bars 44 are freely slidable between the body part 16 and the face plate 24 and are slid endwise upon axial movement of the disk 52. Thus, as illustrated in Fig. 2, the bars 44 are in extended position. The bars 44 are moved to retracted position in a radial direction upon endwise movement of the disk 52 to the left, with the inclined T-slot 58 of the head 52 drawing or pulling inwardly upon the T-head 48 of each bar 44 so as to cause radial movement of the bar 44 incident to axial movement of the disk 52.

The face plate 24 is provided with a plurality of radial grooves 60 in its outer face, said grooves preferably being equiangularly related to each other, and there preferably being at least two grooves 60 for each groove 42 and bar 44. In the form shown, two of the grooves 60 are paired with each of the bars 44, being equiangularly related thereto. A work-holding jaw of any suitable construction, and here identified by the numeral 62, is slidable in each groove 60. The jaws 62 may be constructed to chuck or fit and hold a work piece having a central opening by expanding radially outwardly in that opening, or they may grip a work piece at inner edges of projecting shoulders thereof. In the latter case the jaws 62 may carry work-holding or gripping parts (not shown) which are anchored detachably thereto, as by the use of screws (not shown) anchored in tap bores 64 thereof. The jaws 62 may be of any desired configuration and, if desired, may be of the configuration illustrated in Fig. 3, characterized by reduced width or recessed longitudinal portions 66 accommodating guide ribs 68 upon the face plate 24 projecting longitudinally into the overall outline of the radial grooves 60.

The face plate 24 is provided with recesses 70 at the inner face spaced inwardly from the outer diameter thereof and outwardly from the recess 28 thereof and being circumferentially elongated. Each recess 70 receives freely and slidably therein an elongated rigid compensating link 72. The compensating links 72 are equal in number to the number of bars 44 and are of similar construction. Each link 72 is pivoted at its center by means of pivot pins 74 carried by a bar 44. Each end of each compensating link 72 carries a pin 76 which projects into a transversely elongated groove 78 in the rear or inner face of the adjacent jaw 62 and pivots a shoe or roller 80 having a snug shifting fit in said transverse jaw groove 78.

The radial or transverse dimension of each slot 70 is substantially greater than the width of the compensating link 72 received therein so as to accommodate bodily movement of said compensating link 72 radially incident to the movement of the bar 44 with which it is connected as such bar 44 is moved incident to the axial movement of the head 52 as explained above. The movement of the compensating links 72 occurs in a radial direction but transverse of the length thereof. As this movement of the compensating links 72 occurs, the shoes or rollers 80 on the pins 78 at the ends of the compensating link transmit their radial movement to the jaws 62. The jaws 62 move in directions at an angle to each other and to the direction of movement of the connected bar 44, and this difference in angular direction of movement is accommodated by free shifting fit of shoes or rollers 80 in the transverse slots 78 of said jaws 62. Any inequality of the movement of the two jaws 62 connected with each of the bars 44 is compensated for when the jaws 62 engage the work inasmuch as the jaw which contacts the work first is stopped by the work, and thereupon further actuation of the associated bar 44 transmits to the lagging jaw the movement necessary to bring the lagging jaw into contact with the work. After the jaws contact the work, the further action of the actuator to enhance the clamping action is transmitted equally through the compensating links to all of the jaws so that the gripping force exerted by each jaw upon the work is the same as the gripping force exerted by other jaws. This action occurs in both an expanding type of chuck and a contracting type of chuck. It will be apparent that the operation to effect expansion of the jaws will entail an axial movement of the disk 52 toward the right as viewed in Fig. 2, while a contracting action of the jaws is produced by a movement of the operating disk 52 axially toward the left as viewed in Fig. 2.

It will be apparent that the means for translating the axial movement of the head 52 into a radial component of movement are simple and a minimum number of parts is required. Thus, as illustrated, if there are six jaws 62, the head 52 need only have three slots 56-58 cooperating with three radial bars 44. This reduces the number of parts and reduces the machining operations required upon the parts as compared to a direct individual actuation of each jaw, so as to minimize the cost of the device, reduce the machining operations required, and to facilitate strengthening of the parts in chucks of small size. The compensating links serve to compensate for very slight inequalities or inaccuracies of construction of the parts and, therefore, make possible the operation effectively of the chuck without requiring absolute close tolerance identity of similar working parts associated with the different jaws.

Figure 5:
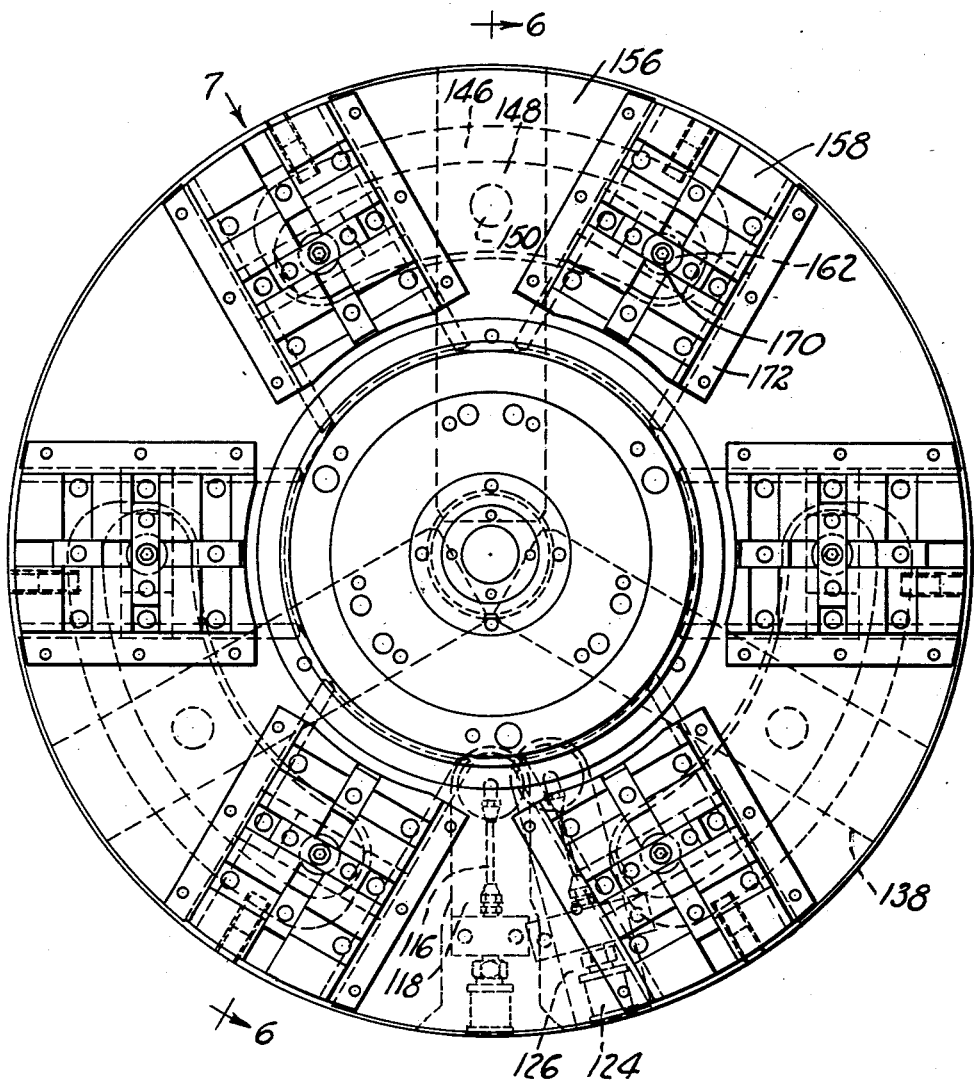
Fig. 5 is a face view of another embodiment of the invention.

The construction illustrated in Figs. 5, 6 and 7 illustrates the application of the use of compensating links in a chuck of the fluid pressure actuating type, for example, a chuck of the general type illustrated in my copending application, Ser. No. 587,007, filed May 24, 1956. In this construction a back plate 90 has a central stepped bore 92 receiving and mounting an annular member 54 having an inner reduced tubular part 96 whose outer diameter is smaller than the diameter of the adjacent portion of the aperture 92 so as to provide an annular groove or passage 98 in the back plate 10, for purposes to be described. A body member 100, preferably of substantially the same size as the back plate 90 and concentric therewith, is provided with an annular rearwardly projecting flange 102 bearing against the plate 90 and secured thereto by securing means, such as the cap screws 103. The annular flange 102 cooperates with the back plate 90 and the body 100 to define a concentric cylindrical cavity within the device.

A piston disk 104 is slidable in the cylindrical cavity and carries a rear annular concentric flange 106 adapted to seat in the groove 98, and a front annular concentric flange 108 adapted to fit slidably in an annular groove 110 formed in the rear face of the body 100. The axial dimension or overall length of the concentric flanges 106 and 108 is greater than the axial dimension of the cylinder cavity outlined by the body part 102.

A pair of annular bladders are positioned within the cylindrical cavity at opposite sides of the piston disk 104. Rear or outer bladder 112 is provided with a fitting 114 connected with a fluid pressure line 116 and associated parts seated in a recess 118 in the rear face of the back plate 90. Bladder 120 is interposed between the piston disk 104 and the body 100 and has connection with a fitting 122 leading to a line 124 mounted in a recess 126 in the front of the body 100. Suitable fluid pressure gauges 128 may be connected with the respective lines 116 and 124, and suitable controls (not shown) for selectively supplying and discharging fluid pressure to the respective bladders 112 and 120 serve to control the extent and direction of movement of the piston disk 104. It will be observed that the flanges 106 and 108 have a sliding fit centrally of the bladders and prevent extrusion thereof incident to sliding movement of the piston unit.

The body 100 has a central opening therein spaced inwardly relative to the annular groove 110 and lined by a bushing 130. A shaft 132 carried by the central portion 134 of the piston disk 104 is slidable in the bushing 130. The shaft 132 terminates in a plurality of equiangularly disposed longitudinally tapered wedge faces 136 at its front end portion.

The front face of the body 100 has a plurality of radial grooves 138 formed therein in equiangular relation, there preferably being three such grooves 138, as seen in Fig. 5. A radial bar 140 is slidable axially in each groove 138. At its inner end each bar 140 mounts a wedge projection 142 adapted to bear against one of the wedge faces 136.

A jaw-carrying plate 144 is carried by and secured to the body 100 concentric therewith. The carrier 144 has a plurality of circumferentially extending and elongated transverse grooves 146 in its rear face. Each groove slidably receives an elongated compensating link 148 pivotally connected at 150 centrally thereof to a bar 140 so as to move the compensating link 148 radially when the bar 140 is moved radially.

The bar carrier 144 has a plurality of radial grooves 152 formed therein, there preferably being twice the number of grooves 152 as there are bars 140, and there being two grooves 152 associated with each bar 140. The grooves 152 extend radially and equiangularly, and each slidably mounts a jaw base 154 retained in part by retainer plates 156 overlapping the margins of the jaw bases 154. Suitable work-holding jaws 158 are carried by the jaw bases 154 and project from the face of the chuck. The rear face of each jaw base 154 has a transverse groove 160 therein, within which shifts a shoe 162 pivoted on a pin 164 carried by one end of the adjacent compensating link 148.

Assuming that the chuck is of the contracting type and that the position thereof as illustrated in Fig. 6 is the work-gripping position, with a work piece being gripped by the inner surfaces 166 of the jaws 158, the control valve for the device may be set to discharge fluid pressure from the bladder 120 through the line 124 and to supply fluid pressure through the line 116 to the bladder 112 to release the jaws from clamping engagement with the work.

Assuming that the chuck is of the expanding type and that in the position of the parts illustrated in Fig. 6 the chuck jaws are in retracted work-releasing position, and also assuming that it is desired to expand the chuck, the valves which control the device will be set to permit discharge of fluid pressure from the bladder 120 through the line 124 and to supply fluid pressure to the bladder 112. This will result in contraction of the bladder 120 and expansion of the bladder 112 with resultant movement of the piston disk 104 to the right as viewed in Fig. 6 for bodily movement of the shaft 132 and the wedge surfaces 136 toward the right. The wedge followers 142 slide on and traverse the wedge surfaces 136 and thereby extend the bars 140 radially outwardly. Coincidentally, the compensating links 148 are shifted outwardly and the jaw bases 154 and jaws 158 are shifted outwardly.

Any inequality in the movement of the respective jaws is compensated by tilting of the compensating links 148 as soon as one jaw of a pair leading the other contacts the work until such time as both jaws of a pair are brought into contact with the work, whereupon equal pressure is exerted upon each pair of jaws as long as application of pressure continues.

Thus the same advantages of compensating for inequalities in movement of the jaws occur in this device as have been described above, and the same advantages of reduction of the number of parts, avoidance of the need of the high degree of accuracy of machining of parts heretofore required for individually or separately operable workholding jaws are achieved in this embodiment of the invention as were described with reference to the embodiment illustrated in Fig. 1.

The construction shown in Figs. 5, 6 and 7 may include means for pivoting each jaw 158 on a jaw base 154 centrally thereof, as by pivot means 170 positioned substantially centrally of each jaw 158. Flange 172 projecting from each side of each jaw 158 with small clearance relative to jaw base 154 limit the rotation of each jaw on its base. Such jaws may have a pair of laterally or circumferentially spaced work engaging parts (not shown), so as to provide twelve work-contact points in a six jaw chuck. Each jaw tilts as needed to orient its two contact points to the work by rocking on pivot 170, followed by compensation as described above relative to the adjacent or paired jaws.

While the preferred embodiments of the invention have been illustrated and described, it will be understood that changes in the construction may be made within the scope of the appended claims without departing from the spirit of the invention.

I claim:
1. A work holding chuck comprising a body, a plurality of work holding members carried by and shiftable radially of said body, said body having an axial bore, a member shiftable axially in said bore and having a plurality of wedge surfaces inclined longitudinally relative to the axis of said member, said body having a plurality of radial passages, a bar slidable in each passage and carrying a wedge-follower at its inner end, an elongated compensating link pivoted centrally to each bar, and means connecting each end of said compensating link to an adjacent work holding member for actuation of said members responsive to said axially shiftable member.

2. A work holding chuck comprising a body having an axial bore and a plurality of radial passages, a member shiftably axially in said bore and having longitudinally tapered surfaces, a plurality of actuator members each shiftable in a radial passage in response to axial movement of said first named member, a plurality of work-engaging members carried by and shiftable radially of said body, a link pivotally connected to each actuator member, and lost motion connection between said link and a pair of adjacent work-engaging members.

3. A work holding chuck comprising a body having two sets of radial guide passages, a work gripping member shiftable radially in each passage of one set, an actuator shiftable radially in each passage of the other set, means for simultaneously shifting said actuator in selected radial direction, a plurality of links, each link being pivoted to an actuator, and lost motion means connecting each link and a pair of adjacent work-gripping members.

4. A work holding chuck comprising a body having two sets of radial guide passages, a work gripping member shiftable radially in each passage of one set, an actuator shiftable radially in each passage of the other set, means for simultaneously shifting said actuator in selected radial direction, a plurality of links, each link being pivoted to an actuator, each gripping member having a transverse groove, and means projecting from the ends of each link and slidable in grooves of adjacent gripping members.

5. A work holding chuck comprising a body having two sets of radial guide passages, a work gripping member shiftable radially in each passage of one set, an actuator shiftable radially in each passage of the other set, means for simultaneously shifting said actuator in selected radial direction, a plurality of links, each link being pivoted to an actuator, each gripping member having a transverse groove, and shoes pivotally carried by the ends of each link and traversing the grooves of adjacent gripping members.

6. A work holding chuck comprising a body having two sets of radial guide passages, each guide passage of one set communicating with two adjacent angularly displaced passages of the other set, an actuator shiftable radially in each passage of said first set, means for simultaneously shifting said actuators, a work gripping member shiftable radially in each passage of the other set, an elongated rigid link pivoted intermediate its ends to each actuator, and means transmitting the radial component only of movement of each end of said link to an adjacent work gripping member.

7. A work holding chuck comprising a body having two sets of radial guide passages, each guide passage of one set communicating with two adjacent angularly displaced passages of the other set, an actuator shiftable radially in each passage of said first set, means for simultaneously shifting said actuators, a work gripping member shiftable radially in each passage of the other set, an elongated rigid link pivoted intermediate its ends to each actuator, and means transmitting the radial component only of movement of each end of said link to an adjacent work gripping member, said last named means including a transversely extending guide on each gripping member shiftably receiving and guiding a part at the end of the adjacent link.

8. A work holding chuck as defined in claim 3, wherein each work-gripping member includes a base portion guided in a radial passage and a work-engaging part pivoted to said base portion.

9. A work-holding chuck as defined in claim 3, wherein each work-gripping member includes a base portion guided in a radial passage and a work-engaging part pivoted to said base portion and having a pair of spaced portions for contacting circumferentially spaced portions of a work piece.

10. A work holding chuck as defined in claim 3, wherein each work-gripping member includes a base portion guided in a radial passage and a work-engaging part pivoted to said base portion, and means for limiting pivoting of said work-engaging part on said base portion.

References Cited in the file of this patent

UNITED STATES PATENTS 2,828,134  Buck et al. _____ Mar. 25, 1958